(12) United States Patent
Feng et al.

(10) Patent No.: US 12,321,388 B2
(45) Date of Patent: Jun. 3, 2025

(54) DATA CONSTRUCTION SYSTEM AND DATA CONSTRUCTION METHOD

(71) Applicants: DIGIWIN CO., LTD., Shanghai (CN); DATA SYSTEMS CO., LTD., New Taipei (TW)

(72) Inventors: Lei Feng, Shanghai (CN); Guoxin Sun, Shanghai (CN)

(73) Assignees: DIGIWIN CO., LTD., Shanghai (CN); DATA SYSTEMS CO., LTD., New Taipei (TW)

( * ) Notice: Subject to any disclaimer, the term of this patent is extended or adjusted under 35 U.S.C. 154(b) by 36 days.

(21) Appl. No.: 18/363,764

(22) Filed: Aug. 2, 2023

(65) Prior Publication Data

US 2024/0394307 A1 Nov. 28, 2024

(30) Foreign Application Priority Data

May 26, 2023 (CN) .......................... 202310609297.0

(51) Int. Cl.
*G06F 16/901* (2019.01)
(52) U.S. Cl.
CPC .................................. *G06F 16/901* (2019.01)
(58) Field of Classification Search
CPC ..................................................... G06F 16/901
See application file for complete search history.

(56) References Cited

U.S. PATENT DOCUMENTS

2015/0347540 A1* 12/2015 Singh .................... G06F 16/254
707/602

FOREIGN PATENT DOCUMENTS

| CN | 112397113 | A | * | 2/2021 | ......... G06F 12/0862 |
| CN | 114201538 | A | * | 3/2022 | ......... G06F 16/2457 |
| CN | 115712581 | A | * | 2/2023 | |

* cited by examiner

Primary Examiner — Hares Jami
(74) Attorney, Agent, or Firm — JCIPRNET

(57) ABSTRACT

A data construction system and a data construction method. The data construction system includes a construction process management unit and a data construction unit. The data construction unit is configured to receive an initiation construction request. The data construction unit obtains corresponding construction rule data from the construction process management unit according to the initiation construction request, and sends an obtaining source data request to the construction process management unit. The construction process management unit receives the obtaining source data request, and calculates a new access location according to a source data identification number and access location information in the obtaining source data request. The construction process management unit obtains corresponding source data according to the new access location, and updates the access location information according to the new access location. The construction process management unit sends the corresponding source data to the data construction unit.

18 Claims, 4 Drawing Sheets

DATA CONSTRUCTION SYSTEM AND DATA CONSTRUCTION METHOD

CROSS-REFERENCE TO RELATED APPLICATION

This application claims the priority benefit of China application serial no. 202310609297.0, filed on May 26, 2023. The entirety of the above-mentioned patent application is hereby incorporated by reference herein and made a part of this specification.

BACKGROUND

Technical Field

The disclosure relates to a data processing technology, in particular to a data construction system and a data construction method.

Description of Related Art

In the conventional process of constructing composite data, the process of data mapping refers to the process in which the system searches for source data and fills the source data into the target structure according to the construction logical relation and construction sequence during the process of constructing composite data. Moreover, when faced with collections and complex nested data structures, there are two stages of acquiring data and constructing data. In this regard, since a multi-level collection nested structure of the collection structure contained in the elements of the collection hierarchy exists in the actual scene, the system constructs each element object sequentially when constructing a collection, and when constructing a complex object structure, the system constructs each subordinate object in the data structure. However, after each structure node is constructed, the next node is to be searched. Therefore, it is necessary to ensure that the attribute fields in the data structure correctly reflect the included attribution characteristics of the collection structure thereof. That is to say, the system needs to traverse the data from the beginning or continue to traverse and search from the traversed location, so the computing resources consumed by the system to traverse and search increase with the increase in the amount of data, which in turn makes the data processing efficiency of the data mapping performed by the system extremely low, and also consumes too many computing resources.

SUMMARY

The disclosure relates to a data construction system and a data construction method, which may realize an efficient data construction function.

According to an embodiment of the disclosure, the data construction system of the disclosure includes a construction process management unit and a data construction unit. The data construction unit is coupled to the construction process management unit. The data construction unit is configured to receive an initiation construction request. The data construction unit obtains corresponding construction rule data from the construction process management unit according to the initiation construction request, and sends an obtaining source data request to the construction process management unit. The construction process management unit receives the obtaining source data request, and calculates a new access location according to a source data identification number and access location information in the obtaining source data request. The construction process management unit obtains corresponding source data according to the new access location, and updates the access location information according to the new access location. The construction process management unit sends the corresponding source data to the data construction unit, and the data construction unit performs data construction according to a corresponding construction rule and the corresponding source data.

According to the embodiment of the disclosure, the data construction method of the disclosure includes the following steps: an initiation construction request is received by a data construction unit; corresponding construction rule data is obtained by the data construction unit from a construction process management unit according to the initiation construction request; an obtaining source data request is sent by the data construction unit to the construction process management unit; the obtaining source data request is received by the construction process management unit, and a new access location is calculated according to a source data identification number and access location information in the obtaining source data request; corresponding source data is obtained by the construction process management unit according to the new access location; the access location information is updated by the construction process management unit according to the new access location; the corresponding source data is sent to the data construction unit by the construction process management unit; and data construction is performed by the data construction unit according to a corresponding construction rule and the corresponding source data.

Based on the above, the data construction system and the data construction method of the disclosure may automatically perform data construction, and may record and update the access location in the process of each source data request, so as to effectively avoid repeated data traversal, thereby greatly improving the operating efficiency of the system and reducing the difficulty of implementing the mapping process.

In order to make the above-mentioned features and advantages of the disclosure comprehensible, embodiments accompanied with drawings are described in detail as follows.

DESCRIPTION OF THE EMBODIMENTS

Figure 1:
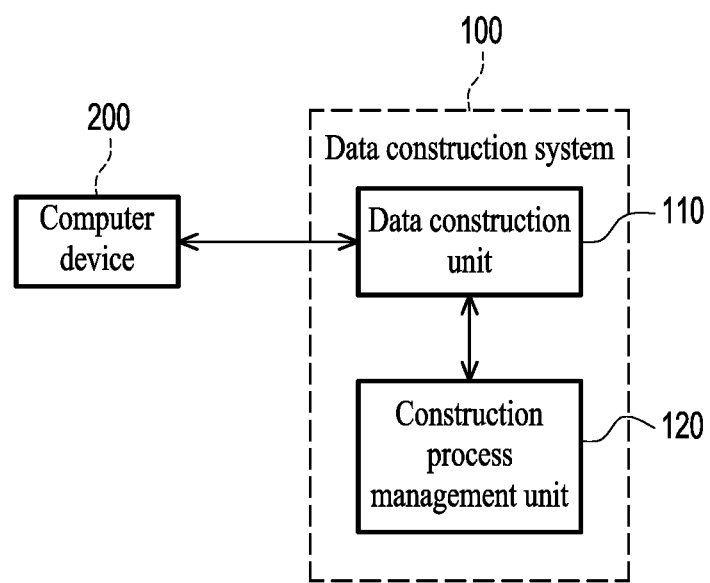
FIG. 1 is the schematic diagram of a data construction system according to an embodiment of the disclosure.

Reference is now made in detail to exemplary embodiments of the disclosure, and examples of the exemplary embodiments are illustrated in the accompanying drawings. Wherever possible, the same reference numerals are used in the drawings and descriptions to refer to the same or similar parts.

FIG. 1 is a schematic diagram of a data construction system according to an embodiment of the disclosure. Referring to FIG. 1, a data construction system 100 includes a data construction unit 110 and a construction process management unit 120. The data construction system 100 is coupled to a computer device 200. The data construction system 100 may be connected with the computer device 200 through network communication. In the embodiment, the computer device 200 may be, for example, a laptop, a desktop, a tablet, a smart phone or related electronic devices. The computer device 200 may be configured to run a business system, and may initiate a data construction request to the data construction system 100 according to operation of a user or a tenant. The business system may be, for example, an enterprise resource planning (ERP) system, a manufacturing execution system (MES), a human resources management system (HRMS) or a financial management system (FMS), and the disclosure is not limited thereto.

In the embodiment, the data construction system 100 may be disposed, for example, on a cloud server or other electronic devices capable of data operation and data storage. The data construction system 100 may include a processor and a memory. In the embodiment, the processor may be a system on a chip (SOC), or may include, for example, a central processing unit (CPU) or other programmable general purpose or special purpose microprocessors, digital signal processors (DSPs), programmable controllers, application specific integrated circuits (ASICs), programmable logic devices (PLDs), other similar processing devices, or combinations thereof. In the embodiment, the memory may be, for example, a dynamic random access memory (DRAM), a flash memory or a non-volatile random access memory (NVRAM) and the like. In the embodiment, the memory may be configured to store the data construction unit 110 and the construction process management unit 120 to be read and executed by the processor, and the memory may further temporarily store relevant data required or generated during the data construction process.

Figure 2:
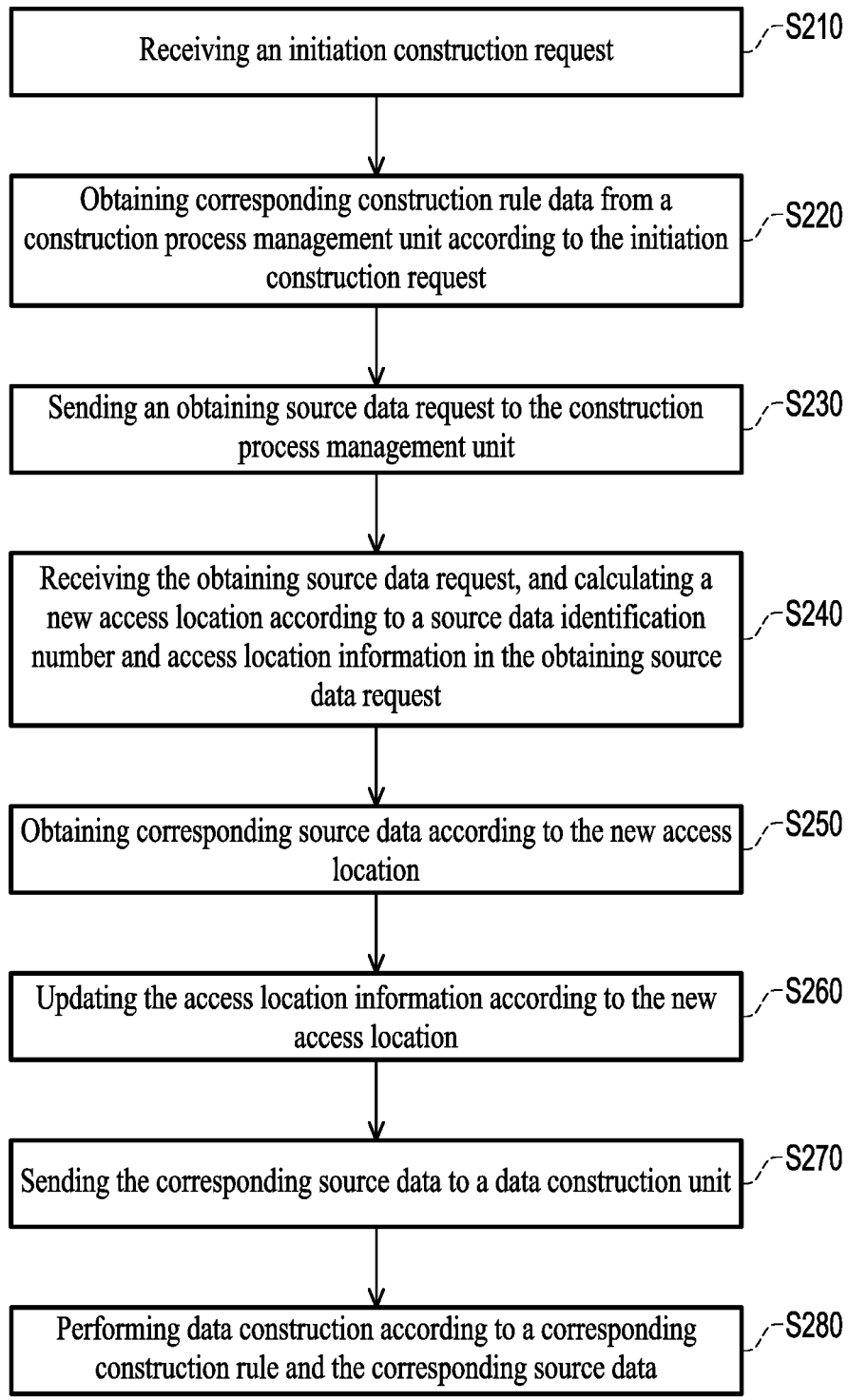
FIG. 2 is a flow chart of a data construction method according to an embodiment of the disclosure.

FIG. 2 is a flow chart of a data construction method according to an embodiment of the disclosure. Referring to FIG. 2, the data construction system 100 may execute the following steps S210 to S280 to realize automatic data construction. In the embodiment, the computer device 200 may send a corresponding initiation construction request to the data construction system 100 according to the operation of the user or the tenant, such as executing an application program interface of a certain service. In step S210, the data construction unit 110 may receive the initiation construction request. In step S220, the data construction unit 110 may obtain corresponding construction rule data from the construction process management unit 120 according to the initiation construction request. The corresponding construction rule data may be stored in a corresponding construction process model, and the construction process model may be stored in a local or external storage device. In the embodiment, the initiation construction request may include a request identification number (ID number), and the data construction unit 110 may generate a source data ID number according to the request ID number.

In step S230, the data construction unit 110 may send an obtaining source data request to the construction process management unit 120. In the embodiment, the obtaining source data request includes the source data ID number. In step S240, the construction process management unit 120 may receive the obtaining source data request, and calculate a new access location according to the source data ID number and access location information in the obtaining source data request. In the embodiment, the construction process management unit 120 may calculate the current access location stored in the corresponding construction process model according to the source data ID number and the access location information. It should be noted that the current access location refers to the location of the current access object where the data construction system 100 performs data reading for one of multiple pieces of source data stored in the storage entity. The access location information refers to the location of the access object of the previous data reading performed by the data construction system 100.

In step S250, the construction process management unit 120 may obtain corresponding source data according to the new access location. In the embodiment, the corresponding source data may be stored, for example, in an external storage device (i.e., the source data management unit below). In step S260, the construction process management unit 120 may update the access location information according to the new access location. In this way, the construction process management unit 120 does not need to traverse the previously read data again during the next operation of reading the source data.

In step S270, the construction process management unit 120 may send the corresponding source data to the data construction unit 110. In step S280, the data construction unit 110 may perform data construction according to the corresponding construction rule and the corresponding source data. Therefore, the data construction system 100 of the embodiment may automatically perform data construction, and may record and update the access location during each source data request, so as to effectively avoid repeated data traversal, thereby effectively improving the operating efficiency of the data construction system 100 and effectively saving computing resources.

Figure 3:
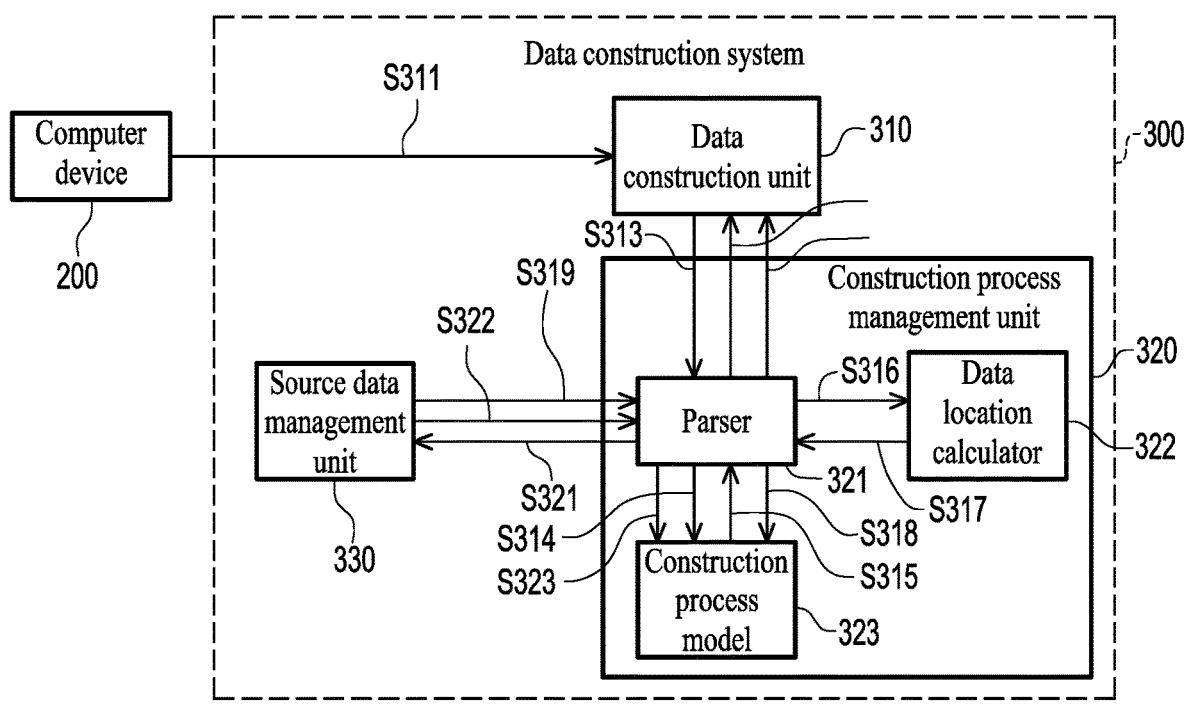
FIG. 3 is a schematic diagram of the operation of data construction according to an embodiment of the disclosure.

FIG. 3 is a schematic diagram of the operation of data construction according to an embodiment of the disclosure. Referring to FIG. 3, a data construction system 300 includes a data construction unit 310, a construction process management unit 320 and a source data management unit 330. In each embodiment of the disclosure, the data construction unit, the construction process management unit and the source data management unit may respectively be implemented in a programming language such as JavaScript Object Notation (JSON), Extensible Markup Language (XML) or YAML, etc., but the disclosure is not limited thereto. In the embodiment, the construction process management unit 320 includes a parser 321 and a data location calculator 322. The data construction system 300 may execute the following steps S311 to S319 to realize automatic data construction. In step S311, the computer device 200 may send a corresponding initiation construction request to the data construction system 300 according to the operation of the user or the tenant. In step S312, the data construction unit 310 obtains corresponding construction rule data from the parser 321 in the construction process management unit 320 according to the initiation construction request. In the embodiment, the construction rule data is provided as an input to the parser 321 for processing.

In step S313, the data construction unit 310 obtains the fields in the corresponding source data through the mapping relationship, so as to initiate an obtaining source data request. In the embodiment, the data construction unit 310 may read the data of the mapping relationship from the construction rule data, or may directly use the construction rule data to obtain the fields in the corresponding source data. In step S314, the parser 321 parses the obtaining source data request, and obtains the construction rule data from a construction process model 323 according to the source data ID number in the obtaining source data request, so as to determine the access location information. In step S315, the parser 321 obtains the previously constructed construction process model 323 from the memory according to the source data ID number in the obtaining source data request, and determines the location of the currently read data. The construction process model 323 has an instance ID number, and the instance ID number is composed of the request ID number and the source data ID number.

In the embodiment, the parser 321 may obtain the corresponding source data from the source data management unit 330 according to the source data ID number. In step S316, the parser 321 sends the source data ID number and access location information to the data location calculator 322. The access location information is configured to indicate the location of the currently read data. The data location calculator 322 may calculate a new access location according to the source data ID number and the access location information. In step S317, the data location calculator 322 sends the new access location to the parser 321. In step S318, the parser 321 records the new access location to the construction process model 323 and updates the access location information. In step S319, the parser 321 reads corresponding source data from the source data management unit 330 according to the new access location. In an embodiment, the source data management unit 330 may be a device configured to store source data. In step S320, the parser 321 sends the corresponding source data to the data construction unit 310. Therefore, the data construction unit 310 may perform data construction according to the corresponding construction rule data and the corresponding source data.

In the embodiment, the parser 321 may traverse the corresponding data structure according to the construction rule data, so as to determine the access location information. The data structure is a tree data structure, but the disclosure is not limited thereto. In the embodiment, the parser 321 may traverse the data structure of the compound data currently to be constructed, so as to collect the relationship and structure among the fields in the data. For example, the parser 321 may determine that the value of the first field is an object structure, and the object structure further includes a second field and a third field. Therefore, the parser 321 may automatically determine that the structure information is that the value described by the first field is an object structure, and may determine the relationship between the fields is that the existence of the second field and the third field belongs to the first field and make a record. Moreover, the parser 321 may traverse the data structure to calculate the number of elements in the array structure. For example, the value of the second field is an array structure, and the parser 321 may calculate the number of elements in the array and make a record. Alternatively, the first field is an array, and the array element is an object structure including the second field and the third field. The second field is again an array of which element is an object and includes the fourth field and the fifth field. During the data construction process, when the parser 321 locates the value of the fourth field, the parser 321 may quickly locate that the value is an element of the array belonging to the first field or the second field. Therefore, the parser 321 may further traverse the data structure to establish the inclusion relationship of the array.

In addition, it should be noted that the data construction performed by the data construction system 300 is an independent and complete process, and parallel data construction does not share source data. Moreover, the source data in the same construction request is unique and cannot be updated during the construction process. In other words, there is single source data in a request. For example, when constructing the data of the relationship between teachers and students, there can only be one copy of the teachers' data and one copy of the students' data, and cannot be updated during the construction process. Moreover, when constructing the relationship data between students and classes at this time, the students' data used to construct the relationship between students and classes does not share the same data as the student data used to construct the relationship between teachers and students.

In the embodiment, taking the data structure as a tree data structure as an example, when the data construction unit 310 needs to obtain a value (source data), the data construction unit 310) may obtain the corresponding node data from the root node of the tree data. When the node is an array structure, the data location calculator 322 may calculate the location of the current access element. Moreover, as the data construction unit 310 is constructed to the leaf node, the location of the array element is constantly updated. When accessing the node of the array structure, the data construction unit 310 may determine whether the current array has been accessed completely, at the same time mark the node that has been accessed, and calculate the next access node and mark the location. When the accessing requests again to return the element in the array, the data construction unit 310 may directly obtain a value and return from the next access node, and repeat the above operation until the completed node and the next access node are the same node, which means that the value can no longer be obtained. In addition, it should be noted that the data construction unit 310 may obtain the parsed model instance (i.e., the construction process model 323) before construction, and construct data cyclically according to the number of elements in the array field. Moreover, when the next array element is requested, if the data location calculator 322 cannot continue to obtain a value, which means that an error in the logic of the construction or in the construction process exists, so the construction process management unit 320 terminates the data component and send a construction error message to the computer device 200.

In the embodiment, the data construction system 300 may further execute the following steps S321 to S323 to automatically create the construction process model 323. In step S321, the parser 321 may automatically check whether the construction process model 323 has been repeatedly created for the source data (new data or source data read for the first time) in the source data management unit 330. If not, in step S322, the parser 321 may obtain the corresponding source data (acquired for the first time), and analyze and identify the source data ID number (identification) of the source data, so as to determine whether the source data has been parsed according to the source data ID number. In this regard, in step S323, since the parser 321 cannot identify the source data ID number (because the corresponding construction process model has not been constructed before), the parser 321 parses the source data to construct the corresponding construction process model 323.

Figure 4:
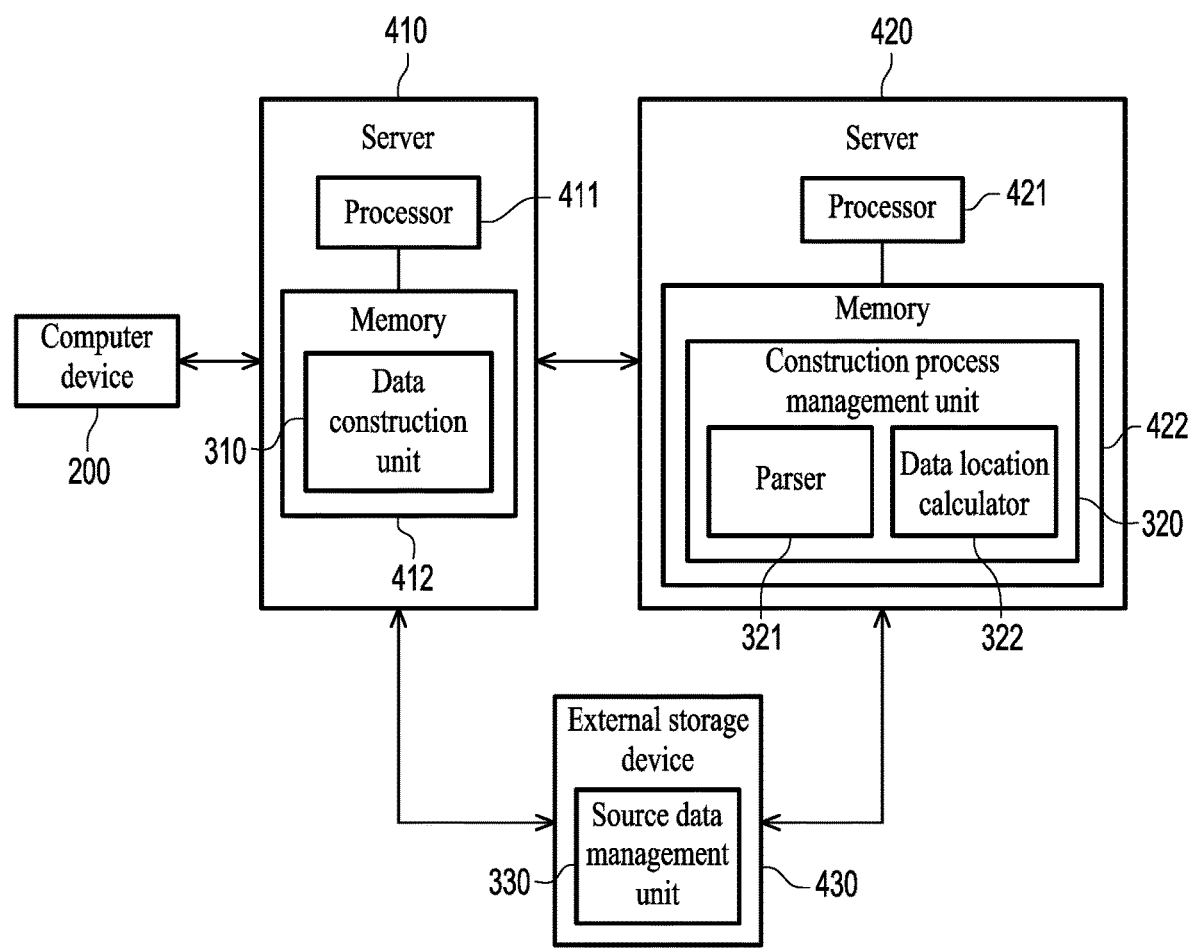
FIG. 4 is a schematic diagram of a data construction system according to another embodiment of the disclosure.

FIG. 4 is a schematic diagram of a data construction system according to another embodiment of the disclosure. Referring to FIG. 4, the data construction unit 310, the construction process management unit 320 and the source data management unit 330 of the embodiment may be implemented in the scenario shown in FIG. 4. In the embodiment, a server 410 includes a processor 411 and a memory 412. The memory 412 may store a relevant program and an algorithm of the data construction unit 310. The processor 411 may read and execute the relevant program and the algorithm of the data construction unit 310 to realize various functions and operations as described in the above-mentioned embodiments. In the embodiment, a server 420 includes a processor 421 and a memory 422. The memory 422 may store a relevant program and an algorithm of the construction process management unit 320. The construction process management unit 320 may further include the parser 321 and the data location calculator 322. The processor 421 may read and execute the relevant program and the algorithm of the parser 321 and the data location calculator 322 to realize various functions and operations as described in the above-mentioned embodiments. In the embodiment, an external storage device 430 may store a relevant program and an algorithm of the source data management unit 330, and the processor 411 of the server 410, the processor 421 of the server 420 or the processor of the external storage device 430 may execute the relevant related program and the algorithm of the source data management unit 330 to realize various functions and operations as described in the above-mentioned embodiments.

In the embodiment, the server 410, the server 420 and the external storage device 430 may be disposed in the cloud, for example, and are respectively disposed in different devices. The server 410, the server 420 and the external storage device 430 may be connected through a wired or wireless communication or network connection. The computer device 200 may be a device disposed on the ground or may be a server disposed in the cloud. The communication connection or network connection between the computer device 200 and the server 410 may be performed in a wired or wireless manner.

To sum up, the data construction system and data construction method of the disclosure may automatically fill the source data into the correct location in the target data configuration to form the final data structure. Moreover, the data construction system and the data construction method of the disclosure may pre-analyze the source data during the data mapping process, and may automatically record the location when the data mapping assembly accesses the data, so that the next data may be provided during the next data access, so as to effectively avoid repeatedly traversing the data, thereby effectively improving the operating efficiency of the system, and effectively saving the computing resources of the system.

Finally, it should be noted that the above embodiments are only used to illustrate the technical solutions of the disclosure, but not to limit the technical solutions of the disclosure. Although the disclosure has been described in detail with reference to the foregoing embodiments, those of ordinary skill in the art should understand that the technical solutions described in the foregoing embodiments may still be modified, or some or all of the technical features thereof may be equivalently replaced. However, these modifications or substitutions do not make the essence of the corresponding technical solutions deviate from the scope of the technical solutions of the embodiments of the disclosure.

What is claimed is:

1. A data construction system, comprising:
a memory, storing programs; and
a processor, coupled to the memory, reading and executing the programs,
wherein the processor is configured to:
receive an initiation construction request;
obtain corresponding construction rule data according to the initiation construction request, and generate sources data request to the construction process management unit;
calculate a new access location according to a source data identification number and access location information;
obtain corresponding source data according to the new access location, and updates the access location information according to the new access location;
perform data construction according to the corresponding construction rule data and the corresponding source data,
wherein the initiation construction request comprises a request identification number, and the processor is configured to:
generate the source data identification number according to the request identification number,
wherein the processor searches for a construction process model according to the source data identification number.

2. The data construction system according to claim 1, wherein the processor is coupled to a storage device,
wherein the processor obtains the corresponding source data from the storage device according to the source data identification number.

3. The data construction system according to claim 2, wherein when the parser determines that the construction process model has not been constructed according to the source data identification number, the parser parses the corresponding source data to construct the construction process model,
wherein an instance identification number of the construction process model comprises the request identification number and the source data identification number.

4. The data construction system according to claim 2, wherein the processor obtains a field in the corresponding source data through a mapping relationship, so as to initiate an obtaining source data request.

5. The data construction system according to claim 2, wherein the parser obtains the construction rule data from the construction process model according to the source data identification number in the obtaining source data request, and determines the access location information.

6. The data construction system according to claim 5, wherein the parser traverses a corresponding data structure according to the construction rule data to determine the access location information,
wherein the data structure is a tree data structure.

7. The data construction system according to claim 2, wherein the data location calculator calculates the new access location according to the source data identification number and the access location information, and the data location calculator sends the new access location to the parser, so that the parser records the new access location and updates the access location information.

8. The data construction system according to claim 2, wherein the storage device is disposed in an external storage device.

9. The data construction system according to claim 1, wherein the programs are stored and executed in different servers.

10. A data construction method, comprising:
receiving, by a data construction unit, an initiation construction request;
obtaining, by the data construction unit, corresponding construction rule data from a construction process management unit according to the initiation construction request;
sending, by the data construction unit, an obtaining source data request to the construction process management unit;
receiving, by the construction process management unit, the obtaining source data request, and calculating a new access location according to a source data identification number and access location information in the obtaining source data request;

obtaining, by the construction process management unit, corresponding source data according to the new access location;

updating, by the construction process management unit, the access location information according to the new access location;

sending, by the construction process management unit, the corresponding source data to the data construction unit; and performing, by the data construction unit, data construction according to the corresponding construction rule data and the corresponding source data, wherein the initiation construction request comprises a request identification number, and the data construction unit generates the source data identification number according to the request identification number, wherein the data construction method further comprises:

searching, by the construction process management unit, for a construction process model according to the source data identification number.

11. The data construction method according to claim 10, wherein the construction process management unit comprises a parser and a data location calculator, wherein obtaining the corresponding source data comprises:

obtaining, by the parser, the corresponding source data from the source data management unit according to the source data identification number.

12. The data construction method according to claim 11, wherein searching for the construction process model comprises:

parsing, by the parser, the corresponding source data to construct the construction process model when the parser determines that the construction process model has not been constructed according to the source data identification number, wherein an instance identification number of the construction process model comprises the request identification number and the source data identification number.

13. The data construction method according to claim 11, wherein initiating the obtaining source data request comprises:

obtaining, by the data construction unit, a field in the corresponding source data through a mapping relationship, so as to initiate the obtaining source data request.

14. The data construction method according to claim 11, further comprising:

obtaining, by the parser, the construction rule data from the construction process model according to the source data identification number in the obtaining source data request, and determining the access location information.

15. The data construction method according to claim 14, wherein determining the access location information comprises:

traversing, by the parser, a corresponding data structure according to the construction rule data to determine the access location information wherein the data structure is a tree data structure.

16. The data construction method according to claim 11, wherein calculating the new access location and updating the access location information comprise:

calculating, by the data location calculator, the new access location according to the source data identification number and the access location information; and sending, by the data location calculator, the new access location to the parser, so that the parser records the new access location and updates the access location information.

17. The data construction method according to claim 11, wherein the source data management unit is disposed in an external storage device.

18. The data construction method according to claim 10, wherein the construction process management unit and the data construction unit are disposed in different servers.

* * * * *